(No Model.)

D. P. FACKLER.
VOUCHER INSTRUMENT FOR USE BETWEEN PRINCIPAL AND AGENT.

No. 552,635. Patented Jan. 7, 1896.

Witnesses
C. E. Ashley
H. W. Lloyd

Inventor
David Parks Fackler
By his Attorney
Willard Parker Butler

United States Patent Office.

DAVID PARKS FACKLER, OF NEW BRIGHTON, NEW YORK.

VOUCHER INSTRUMENT FOR USE BETWEEN PRINCIPAL AND AGENT.

SPECIFICATION forming part of Letters Patent No. 552,635, dated January 7, 1896.

Application filed May 25, 1894. Serial No. 512,438. (No specimens.)

*To all whom it may concern:*

Be it known that I, DAVID PARKS FACKLER, a citizen of the United States, and a resident of New Brighton, Richmond county, State of New York, have invented a new and useful Improvement in Voucher Instruments for Use Between Principal and Agent, of which the following is a specification.

My invention relates to an improvement in receipts, drafts, or other papers requiring fiduciary action by an agent for the use of private individuals and corporations who are in the habit of doing business through agents for the purpose of indicating by directions contained therein or by the manner of using the relations existing between the agent and the party with whom he is to transact business at a given time. For example, many individuals and corporations are obliged to rely upon agents for the purposes of collecting sums of money, varying from time to time in amount. This is particularly the case with life-insurance corporations and other large moneyed corporations who have to rely upon their agents for the purposes of collecting premiums and other amounts due them. These agents are often located in places scattered over a wide area, many thousands of miles from the home office of the corporation, and it becomes at times extremely difficult to ascertain from these agents what premiums or sums have been collected by them, whether the same have been promptly paid, whether the time to pay them has been extended, whether they have not been paid at all, or whether they have been actually paid to the agents and are represented by the agent to the home office as unpaid.

The object of the invention is to provide a simple, economical, and convenient form of receipt, draft, or other instrument which will operate as a check upon the agent and afford a voucher for the principal in each and every one of the cases above referred to when used in the manner directed by the principal.

The invention will be best understood by reference to the accompanying sheet of drawings, which forms a part of this specification, in which—

Figure 1 shows the instrument provided with a single coupon, and Fig. 2 the instrument provided with more than one.

Similar letters refer to similar parts throughout both the views.

In Fig. 1 the letter A indicates the instrument itself without reference to its precise use, which, as will appear therefrom, is composed of two parts, $A'$ the instrument proper and $A^2$ the coupon which is attached thereto in any convenient manner which will enable the same to be readily detached. On the face of the main instrument is a receipt or order to pay or other obligation of any desired form, varying in phraseology from time to time, as may be found applicable to the necessities of the particular business for which the instrument is used.

At any convenient part of the instrument proper—as, for example, within the space indicated by the letter B in the drawings—is placed a direction which states, in the case when the instrument is a receipt, that if the sum of money to be paid to the agent be paid before it becomes overdue, then the instrument should bear the coupon as an integral part thereof. The phraseology of this direction or statement may vary from time to time as may be found desirable, according to the particular purposes for which the instrument may be used.

The "coupon," so called, (indicated by the letter $A^2$,) may contain and preferably should contain a number corresponding to that borne by the principal instrument $A'$ or other special designation which will enable the party receiving the coupon to identify the same as a part of a specific instrument theretofore sent out by it. The coupon, in the case of a receipt, also contains, arranged at any convenient point and stated in any desired language, a direction that if the premium or other sum to be paid has not been paid at the close of business upon a given date appearing on the face of the receipt, the coupon is to be cut off and forwarded to the principal immediately, or, if desired, within a given space of time, or the same directions may be stated upon the chief instrument, or upon both, as may be desired.

On the face of the instrument and across the line of separation of the two parts $A'$ and $A^2$ is a well-defined space $a$, which on the drawings is marked in outline, but which may be made conspicuous in any suitable way, and in this space $a$ is appropriate language, which will indicate when the receipt is delivered with the coupon undetached that the premium or other sum of money to be paid was paid promptly and not after the due date, and yet the whole so arranged that when the coupon is detached the opposite thereof will appear from such portion of the phraseology or language used as will be left upon the principal part of the instrument. An example of such an arrangement is shown on the drawings, where the words "N. B.—This premium was paid promptly and not after the due date" are shown so arranged that the dividing-line of the coupon comes between the word "paid" and the word "promptly," and thus when the receipt is delivered with the coupon intact the entire phrase appears upon the same. When, however, the coupon is detached, the words "promptly and not" are removed and the sentence reads, "This premium was paid after the due date." Appropriate language may be used either to state this or any other desired fact of a similar character, either of an affirmative or negative nature, from time to time, as may be desired, according to the specific uses to which the instrument may be applied.

The method of operation of the invention is as follows: For the purpose of explanation I will assume that the instrument is being used by a life-insurance company having a head office in New York and agencies in the various Western States for the purposes of a receipt. The practice of life-insurance companies is to prepare in advance a series of receipts, signed by the proper officers, for all premiums falling due within a period of, say, one month, and to forward the same to their agents in the various towns in or near which the various policy-holders reside, and the practice is to permit the agent to collect the premiums, to authorize him to deliver the receipts on payment, and to remit the premiums so collected, less commissions, to New York, according to the specific instructions given. When, we will say, twenty of these receipts are sent to an agent in the West, on receiving a premium from a policy-holder upon the date upon which the same is due, or before, the agent will then, pursuant to the instructions, deliver the entire receipt to the party paying the premium. In case the party fails to pay the premium promptly the agent is then required to forthwith detach the coupon and return the same to the head office. It will be apparent, therefore, that out of twenty receipts sent out, where coupons are not returned within a given period, the home office can at once assume that the agent has been paid and can proceed to hold him responsible for the amounts collected. When, however, a certain number of coupons are returned, the head office is at once able to determine how many premiums are still unpaid and outstanding. In this way a check is placed not alone on the agent, but a receipt is prepared for the party paying the premium which, on its face, does not in any way suggest that the instrument delivered to him is serving police duty between the home office and any particular agent, and in this way also the receipt acts automatically in serving to protect the payer and to relieve the agent from suspicion.

In the form shown in Fig. 2 the instrument is shown provided with two or even more coupons $A^2$ and $A^3$, if desirable, to show further defaults or postponement of any kind. These may be arranged in any convenient manner with reference to the chief instrument, arranged preferably as shown, and may bear appropriate directions and statements similar to those indicated above in this figure. Under this plan, in the case of a receipt, the first could be detachable and returnable if the premium be not paid on becoming due, and the remaining coupon $A^3$, or additional coupons, if they exist, would then be successively detachable and returnable if the premium be not paid at the expiration of the successive intervals designated.

The invention is not necessarily limited to use as a receipt, but may be used for any other purpose where it is desired to provide proof between a principal and an agent as to the existence or non-existence of a given state of facts. It is also not limited to the use of any specific words upon the instrument, but the phraseology may be varied or limited, or even reduced to a minimum, according to circumstances, as may be desired, or the instructions may be given in a separate instrument.

I claim as my invention—

An instrument of the kind described, complete in itself and adapted for use without separation, but having separable parts, and a bi-sectional phrase extending across the line of separation, the structure of the phrase being such as to radically change the tenor or meaning of the instrument when the latter is severed.

In testimony that I claim the foregoing as my invention I have signed my name, in presence of two witnesses, this 8th day of May, 1894.

DAVID PARKS FACKLER.

Witnesses:
GEORGE FERRY SALTER,
CHARLES H. ANGELL.